United States Patent
Saund et al.

(10) Patent No.: US 7,036,077 B2
(45) Date of Patent: Apr. 25, 2006

(54) METHOD FOR GESTURAL INTERPRETATION IN A SYSTEM FOR SELECTING AND ARRANGING VISIBLE MATERIAL IN DOCUMENT IMAGES

(75) Inventors: Eric Saund, San Carlos, CA (US); Edward Lank, San Francisco, CA (US)

(73) Assignee: Xerox Corporation, Stamford, CT (US)

( * ) Notice: Subject to any disclaimer, the term of this patent is extended or adjusted under 35 U.S.C. 154(b) by 735 days.

(21) Appl. No.: 10/104,396

(22) Filed: Mar. 22, 2002

(65) Prior Publication Data

US 2003/0182630 A1 Sep. 25, 2003

(51) Int. Cl.
*G06F 17/00* (2006.01)

(52) U.S. Cl. .................. 715/530; 345/179; 345/156
(58) Field of Classification Search .................. 715/530, 715/540, 500, 502, 541, 512; 345/156, 179
See application file for complete search history.

(56) References Cited

U.S. PATENT DOCUMENTS

| | | | | |
|---|---|---|---|---|
| 5,252,951 | A | | 10/1993 | Tannenbaum et al. ...... 345/156 |
| 5,513,309 | A | | 4/1996 | Meier et al. ................. 395/155 |
| 5,523,775 | A | | 6/1996 | Capps ......................... 345/179 |
| 5,555,369 | A | * | 9/1996 | Menendez et al. .......... 715/762 |
| 5,691,748 | A | * | 11/1997 | Fukuzaki ..................... 345/173 |
| 5,867,150 | A | | 2/1999 | Bricklin et al. ............. 345/173 |
| 5,953,735 | A | | 9/1999 | Forcier ........................ 707/541 |
| 6,097,392 | A | * | 8/2000 | Leyerle ....................... 715/863 |
| 6,104,317 | A | * | 8/2000 | Panagrossi .................... 341/20 |
| 6,340,967 | B1 | * | 1/2002 | Maxted ....................... 345/179 |
| 6,664,991 | B1 | * | 12/2003 | Chew et al. ................ 715/863 |
| 2001/0045949 | A1 | * | 11/2001 | Chithambaram et al. ... 345/418 |
| 2002/0015064 | A1 | * | 2/2002 | Robotham et al. .......... 345/863 |
| 2004/0169635 | A1 | * | 9/2004 | Ghassabian ................. 345/156 |

OTHER PUBLICATIONS

Gross, Mark D., et al, "Ambiguous Intentions: A Paper–Like Interface for Creative Design", ACM, 1996, pp. 183–192.*
Mynatt, Elizabeth D., et al, "Flatland: New Dimensions in Office Whiteboards", ACM, 1999, pp. 346–353.*
Bailey, Brian P., et al, "DEMAIS: Designing Multimedia Applications with Interactive Storyboards", ACM, 2001, pp. 241–250.*
Hong, Jason I., et al, "SATIN: A Toolkit for Informal Ink–Based Applications", ACM, 2000, pp. 63–72.*
Meyer, Andre, "Pen Computing—A Technology Overview and a Vision", SIGCHI Bulletin, vol. 27, No. 3, Jul. 1995, pp. 46–90.*
Saund, Eric, et al, "A Perceptually–Supported Sketch Editor", Proceedings of the $7^{th}$ Annual ACM Symposium on User Interface Software and Technology, Nov. 1994, pp. 175–184.*
Forsberg, Andrew, et al, "The Music Notepad", Proceedings of the $11^{th}$ Annual ACM Symposium on User Interface Software and Technology, Nov. 1998, pp. 203–210.*

(Continued)

Primary Examiner—Joseph Feild
Assistant Examiner—Laurie Anne Ries
(74) Attorney, Agent, or Firm—Linda M. Robb

(57) ABSTRACT

A graphical input and display system for creating and manipulating image object(s) includes input devices permitting a user to select elements of image object(s) received from various image input sources. A processor, connected to the system, receives requests for various image editing operations and also accesses a user interaction module which enables the user to enter new image material or select and modify existing image material without pre-selecting an input mode. The system data memory structure includes a displayed objects data structure, and internal state data structure, and a selected material data structure.

24 Claims, 3 Drawing Sheets

OTHER PUBLICATIONS

Hong, Jason I., et al, "SATIN: A Toolkit for Informal Ink–Based Applications", Proceedings of the 13$^{th}$ Annual Symposium on User Interface Software and Technology, Nov. 2000, pp. 63–72.*

Moran, Thomas P., et al, "Spatial Interpretation of Domain Objects Integrated into a Freeform Electronic Whiteboard", Proceedings of the 11$^{th}$ Annual ACM Symposium on User Interface Software and Technology, Nov. 1998, pp. 175–184.*

Bailey, Brian P., et al., "Authoring Support: DEMAIS: Designing Multimedia Applications With Interactive Storyboards", Proceedings of the Ninth ACM International Conference on Multimedia, Oct. 2001, pp. 241–250.*

* cited by examiner

METHOD FOR GESTURAL INTERPRETATION IN A SYSTEM FOR SELECTING AND ARRANGING VISIBLE MATERIAL IN DOCUMENT IMAGES

CROSS REFERENCE TO RELATED APPLICATIONS

The following co-pending applications, U.S. application Ser. No. 10/104,523, filed Mar. 22, 2002, titled "Method and System for Interpreting Imprecise Object Selection Paths", U.S. application Ser. No. 10/104,804, filed Mar. 22, 2002, titled "Method and System for Overloading Loop Selection Commands in a System for Selecting and Arranging Visible Material in Document Images", and U.S. application Ser. No. 10/104,805, filed Mar. 22, 2002, titled "System and Method for Editing Electronic Images", are assigned to the same assignee of the present application. The entire disclosures of these co-pending applications are totally incorporated herein by reference in their entirety.

INCORPORATION BY REFERENCE

The following U.S. patents are fully incorporated herein by reference: U.S. Pat. No. 5,513,309 to Meier et al. ("Graphic Editor User Interface for a Pointer-Based Computer System"); U.S. Pat. No. 5,523,775 (1996) to Capps ("Method for Selecting Objects on a Computer Display"); and U.S. Pat. No. 5,953,735 to Forcier ("Script Character Processing Method and System with Bit-Mapped Document Editing").

BACKGROUND OF THE INVENTION

This invention relates generally to graphical image manipulation systems, and more particularly to a user interface for creating and editing electronic images of documents.

In interactive sketching and drawing systems, a single mouse/pen/stylus device serves both to input image material, through draw operations, and to perform command operations such as inputting a spatial selection gesture that selects out certain image objects to be operated on further, such as being moved, copied, or deleted. In existing systems, the user must indicate which type of input is to be performed by setting a "mode". The necessity for setting the user interface mode becomes a distraction in the editing process and impedes the smooth flow of sketching and interactive editing tasks. Moreover, errors occur when users execute draw or selection/command gestures but neglect to ensure that the application is set to the mode corresponding to their intended action.

Two types of interactive drawing/sketching/editing applications are currently in use, both of which support creation of new image material, through draw operations, and selection and manipulation of existing material, through editing operations. The types of interactive applications are distinguished by the emphasis placed on "sketch" and "editing" operations. In an image "editing" program, selection and manipulation of image objects is the primary activity. Therefore, stylus or mouse interaction is designed primarily to interpret stylus input as selection gestures, and the default interpretation of mouse or stylus activity is selection of existing image objects for manipulation. Tools for drawing objects are provided by auxiliary command objects, usually menus.

In a "sketch" program, however, the primary activity is the "draw" operation. To facilitate the sketching process, it is important for users to be able to quickly execute a series of markings such as handwritten or sketched strokes, without having to perform a menu initiation command at every stroke. These programs are designed such that draw operations can be the default interpretation of mouse or stylus activity. The disadvantage to this type of program is that when priority is placed on draw operations, selection operations become demoted and require explicit menu choices or button clicks to invoke a selection, which impedes the smooth flow of multiple selection and manipulation operations.

One approach to resolving the question of the interpretation of mouse or stylus activity is the use of interface modes. Under one technique, the application is placed in "draw" mode or "select" mode by activation of a menu item, and is left in that mode until the user switches to another. Under another technique, the application is left in the "draw" mode unless the user depresses a mouse or pen button, which then places the application the "select" mode. In both of these cases, the user must be aware of the mode currently activated, and perform additional steps to switch modes as needed. Both editing and sketching programs may use modes in this manner.

U.S. Pat. No. 5,513,309 to Meier et al. titled "Graphic Editor User Interface for a Pointer-Based Computer System" discloses a graphical editor arranged to permit the user to edit selected graphic objects by highlighting the objects and moving them with editing handles. A bounding box is also drawn about the selected portions of the object. In various aspects of the invention, the user is permitted to edit the object by executing specific actions, including resizing, duplicating, distorting and moving either the entire object or only selected portions. After any of the editing operations is performed, the display is updated to reflect changes made during the editing step.

U.S. Pat. No. 5,523,775 (1996) to Capps titled "Method for Selecting Objects on a Computer Display" teaches a method for selecting objects on a screen of a pen-based computer system. The user's intention to enter the selection mode is indicated by the user's performing a special action with the stylus, such as holding the stylus in one place for a minimum amount of time, tapping the stylus immediately prior to and in the same location the highlighted gesture is to begin, or drawing a small circle. Each of these approaches is prone to user error. For example, a user may place the stylus down while thinking about the shape of the stroke to be drawn and unexpectedly be placed in a "highlight" (selection) mode. Similar problems occur with the "tap-and-a-half" and "small circle" methods described in Capps. Like other existing methods in this field, under the Capps invention the user is required to declare in advance of their stroke that the stroke is to be interpreted in terms of "highlight" (select) mode.

U.S. Pat. No. 5,953,735 to Forcier titled "Script Character Processing Method and System with Bit-Mapped Document Editing" teaches a pen-based processor which enables a user to input and edit script like a text-based computer, but retains a resemblance to the use of a pad and pencil. The system enables the input, editing, and other manipulation of glyphs, including handwritten script, ASCII text, bit-mapped images and drawings in a common document, using a compatible internal representation of the data and a set of user control functions. These functions are invoked using a two-step gesture method to avoid confusion between strokes and command gestures and also to allow use of similar gestures for different functions within the same and different contexts. Again, the intended mode must be specified by the user before a stroke is initiated. The system infers from customary user writing conventions that certain relationships of data are to be preserved, including delineation of words and paragraphs, and maintains the relationships, subject to user override, during editing. The display document is formatted to contain lined or unlined areas of glyphs that can be edited such as by mapping each glyph in the image lines to a machine editable line space, including insertion of a moving space into pre-existing document text and word wrapping.

The present invention offers a new user interface technique employed in an interactive digital ink sketch/drawing/editing program. Instead of requiring the user to set input mode, such as "Draw Mode" or "Select Mode" initially and then interpreting gestures according to the specified mode, the present invention postpones the decision as to which mode the user intends until the gesture is complete. If the type of gesture can be inferred from its shape and timing characteristics in relation to data structures describing individual image objects and groupings of these objects, then the gesture is invoked as that type. Only if the gesture is ambiguous is the user presented with the opportunity to choose between the modal options.

SUMMARY OF THE INVENTION

Briefly stated, and in accordance with one aspect of the present invention, there is disclosed herein a graphical input and display system for creating and manipulating elements of image object(s) received from various image input sources. A processor, connected to the system, receives requests for various image editing operations and also accesses a user interaction module which enables the user to enter new image material or select and modify existing image material without pre-selecting an input mode. The system data memory structure includes a displayed objects data structure, and internal state data structure, and a selected material data structure.

In another aspect of the invention, there is disclosed a method for utilizing a user interface on a graphical input and display device having user input means, image input means, a processor, and a user interaction module for entering new image material or selecting and modifying existing image material without pre-selecting an input mode to create and edit an electronic image object. After receiving a user input gesture, the processor determines whether the gesture is a selection operation, a draw operation, or an ambiguous operation. Draw operations are rendered as permanent marks. Selection operations are serviced, and the processor presents the user with a choice for interpreting an ambiguous operation.

In yet another aspect of the invention, there is provided an article of manufacture in the form of a computer usable medium having computer readable program code embodied in the medium. When the program code is executed by the computer, the computer usable medium causes the computer to perform method steps for invoking draw or select/command operations without setting a user interface mode prior to creating and manipulating a source electronic image. The program readable code causes the computer to determine whether a user input gesture is a selection operation, a draw operation, or an ambiguous operation. Draw operations are rendered as a permanent mark, while selection operations are serviced. The user is presented with a choice for the interpretation of ambiguous gestures.

In another aspect of the invention, there is provided a memory for storing data for access by a program being executed on a computer for invoking draw or select/command operations without setting a user interface mode prior to creating and manipulating a source electronic image. The memory includes a displayed objects data structure and an internal state data structure, as well as a selected material data structure. The internal state data structure includes a mouse/stylus path and a choice presented state.

BRIEF DESCRIPTION OF THE DRAWINGS

The foregoing and other features of the instant invention will be apparent and easily understood from a further reading of the specification, claims and by reference to the accompanying drawings in which:

DETAILED DESCRIPTION OF THE INVENTION

Figure 1:
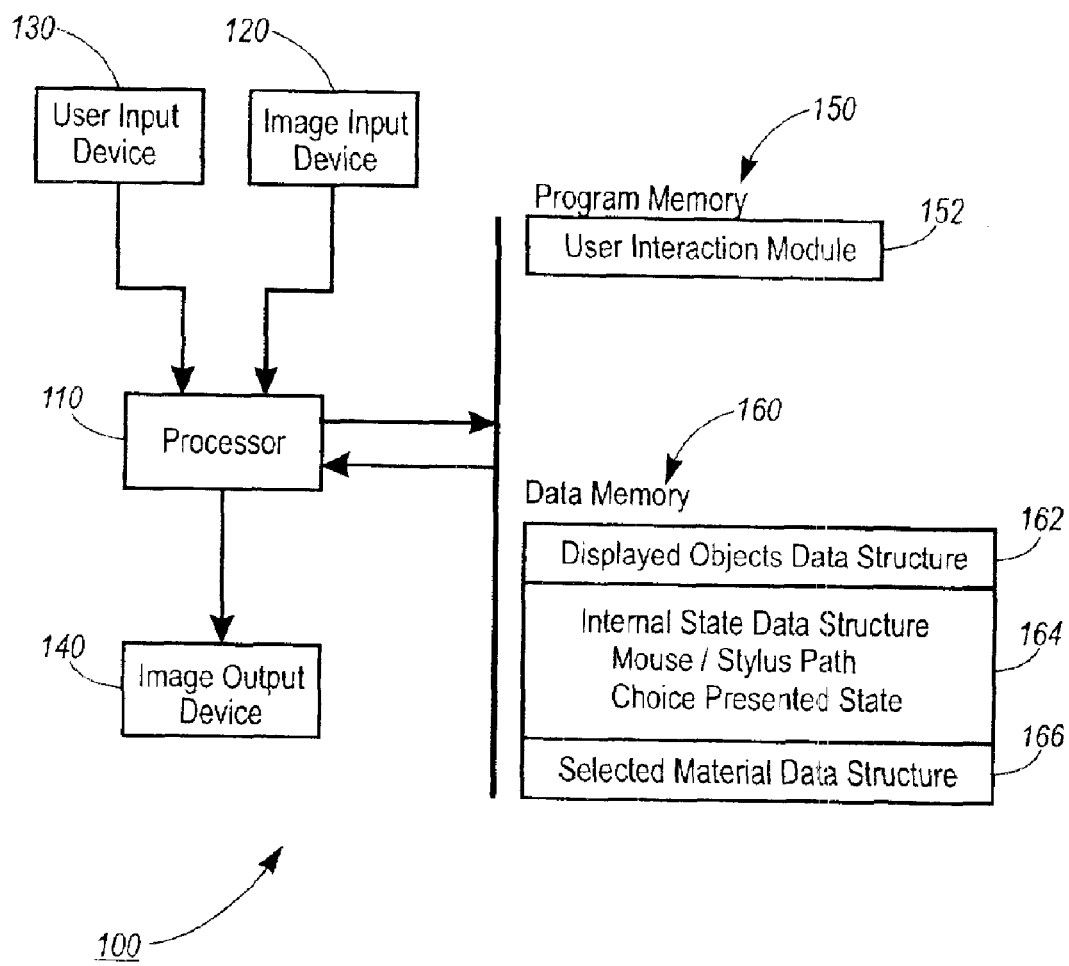
FIG. 1 is a block diagram showing general components of a system that can edit images according to the invention.

Disclosed herein is a method and apparatus for fluid editing of a document image. In the following description numerous specific details are set forth in order to provide a thorough understanding of the present invention. It would be apparent, however, to one skilled in the art to practice the invention without such specific details. In other instances, specific implementation details such as parsing techniques for extracting characters from a document image, have not been shown in detail in order not to unnecessarily obscure the present invention.

As will become apparent in the description below, the present invention finds particular advantage in editing text and line art contained in an image. Documents which are faxed or which are copied on a digital copier typically involve images that contain primarily text and graphics. As described with respect to the prior art, it is common that in order to edit any of the text contained in the image, extraneous processing such as Optical Character Recognition (OCR) or the placement of image information into layers must be performed. As will become apparent, the present invention minimizes extraneous processing and provides added flexibility to defining both text and graphical image information so as to allow the editing of a wider range of textual and graphical data in an image. The text and graphical material may arise from a scan or digital photograph of paper, whiteboard, or other physical document media, or it may arise from a digital pen, stylus, or other digital ink recording device, or any combination thereof.

A number of terms are used herein to describe images and related structures, and the terms defined below have the meanings indicated throughout this application, including the claims.

The present invention permits fluid execution of repeated and intermixed draw and select/modify operations by eliminating or minimizing the requirement that the user become aware of or make any actions with prior regard to "draw" or "select" user interface modes. This is accomplished by re-architecting the user interaction cycle, and applying a small amount of perceptual interpretation to user gestures and the image material of the drawing. By this invention, the application program can in many cases infer the user's intent from the shape of the gesture and other properties, thus relieving the user from having to specify the user's intent as a required operation. Only in cases where the user's intent cannot be inferred with confidence does the application program present the user with a post-hoc choice. This removes the danger of having the system perform an erroneous selection gesture or draw operation under an unintended mode. In the present invention, the user must respond to the choice presented only if they intend to perform a selection operation. Otherwise, the user may ignore the choice option and proceed with draw operations.

Referring now to FIG. 1, system 100 includes processor 110, connected to receive signals from image input device 120 and user input device 130. Image input device 120 could be a scanner, a facsimile receiver or other image receiver, a camera, or other appropriate device or could be a part of local or remote memory that stores an image in digital form. Image input device 120 could also be a pen, stylus, or other digital ink recording device. User input device 130 could be, for example, a mouse, a pen, or a stylus. Processor 110 can also be connected to image output device 140, such as a screen display, a printer, a facsimile transmitter or other image transmitter, or a part of local or remote memory that can store an image in digital form. Processor 110 may be configured as a windows-type system.

Processor 110 is also connected to access program memory 150 and data memory 160. Program memory 150 includes user interaction module 152. Data memory 160 includes displayed objects data structure 162, internal state data structure 164 and selected material data structure 166. For the purposes herein, displayed objects data structure includes image objects, for example, a single bitmap image, multiple bitmap images that may be arrayed on the same display, digital ink strokes, or any other data object that has a displayable representation. In executing the routines of user interaction module 152, processor 110 loads data from image input device 120 into displayed objects data structure 162. User interaction module 152 makes use of several data structures and processing modules. As shown, internal state data structure 164 includes one or more subsidiary data structures including mouse/stylus path and choice presented states.

Figure 2:
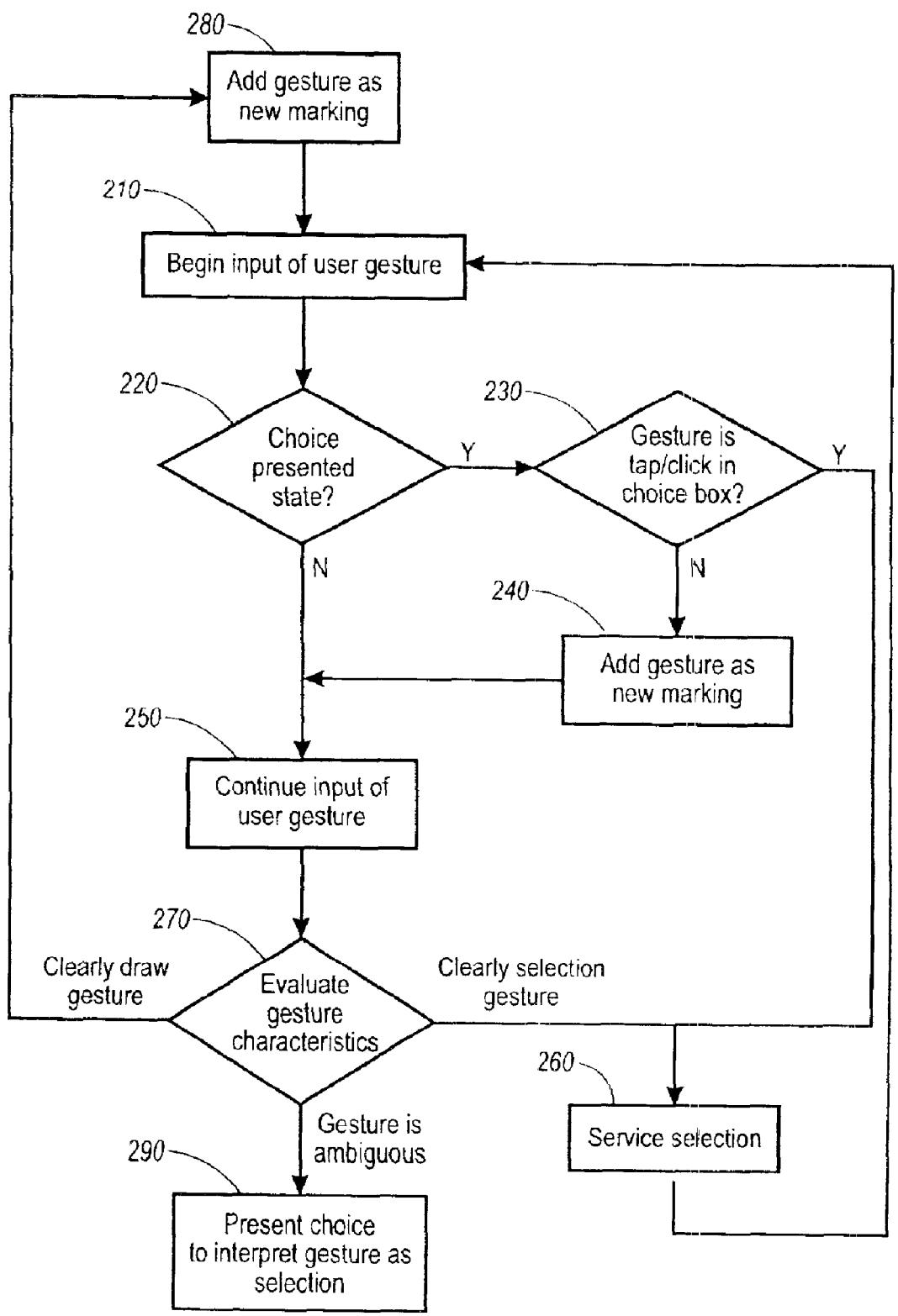
FIG. 2 is a flow chart showing steps in entering and modifying electronic image material according to one embodiment of the invention.
Figure 3:
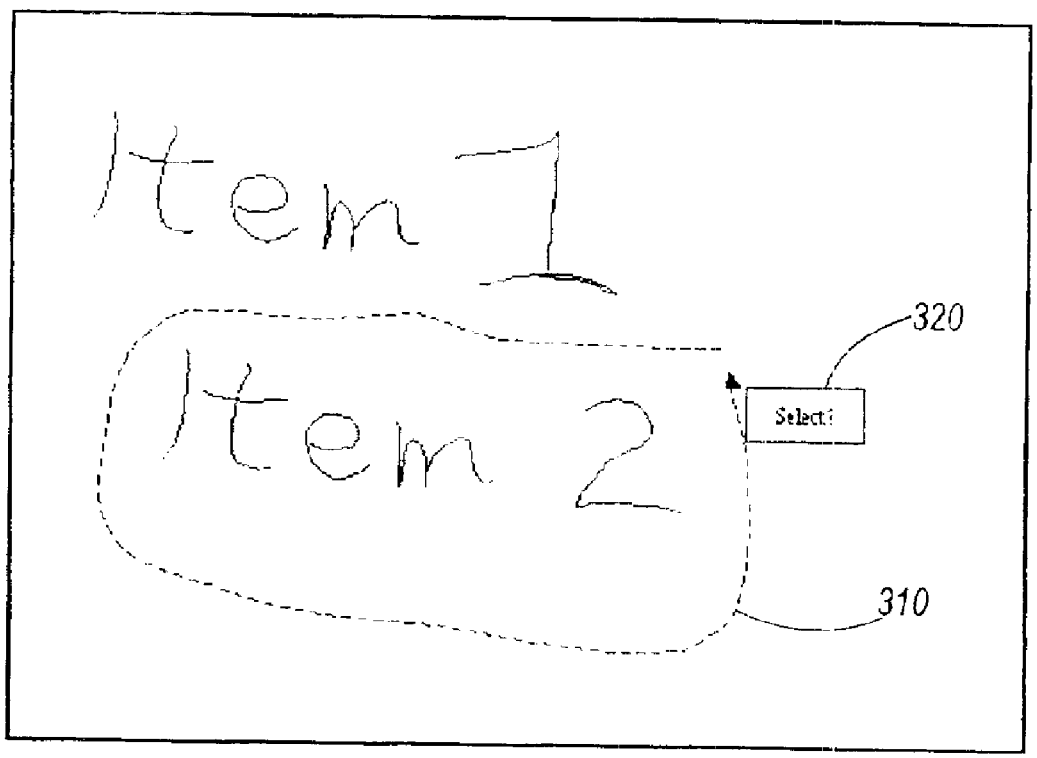
FIG. 3 is an illustration showing an ambiguous operation and a pop-up choice menu.

Referring now to FIGS. 2 and 3, FIG. 2 illustrates the steps in the user interaction cycle according to the present invention. The user interaction cycle begins with the user initiating a gesture, which could be either drawn digital ink content or a command/selection gesture, by pressing or touching the stylus, pen, or mouse. This occurrence is indicated by the processor passing a "stylus down" event or equivalent at Step 210 of the interaction module 152, whose logic is indicated in FIG. 2. At Step 220 a determination is made as to whether the system is in "choice presented state" by consulting the "CHOICE_PRESENTED_STATE" internal state variable. At the outset of user interaction this variable is initialized to the value, FALSE. If at Step 220 the CHOICE_PRESENTED_STATE is FALSE, then the user's input is gathered until the stylus is lifted or mouse button is released. This input may be a stroke consisting of a series of mouse/stylus locations, or it may be a "tap" if the pointing device is lifted/released at the same location where it was set down or the button was pressed. In the event that a stroke is being drawn, at step 250 this gesture may be rendered on the display as a tentative path, such as a dotted line, shown as dotted line 310 in FIG. 3. When the gesture is completed, various tests are then employed at step 270 to determine whether a user gesture can be interpreted as an unambiguous draw operation, an unambiguous selection operation, or an ambiguous operation.

If the gesture is a "tap" located on top of or immediately beside an image object, then it is interpreted as a selection gesture and that object is selected and processing proceeds to step 260. Repeated taps at approximately the same location may be used to cycle through groups that this object belongs to, as described in co-pending U.S. Application Ser. No. 10/104,804 titled "Method and System for Overloading Loop Selection Commands in a System for Selecting and Arranging Visible Material in Document Images" and cited hereinabove. Servicing the selection at step 260 involves highlighting or otherwise indicating which object(s) are selected and entering a state whereby further input gestures may be interpreted as move, delete, or other operations on the selected objects, as is standard in the art. For example, a pop-up menu of operations may be presented for the user to select among, including Move, Delete, Rotate, Duplicate, etc. Furthermore, the selected object(s) may be highlighted, and Move operations may be executed by pressing the mouse/stylus on a selected object and dragging it.

If the gesture is a tap not located on top of or immediately beside an image object, then the gesture is interpreted as a drawn "dot" of digital ink, and at step 280 is rendered as such on the display and recorded as such in the displayed objects data structure.

If the gesture is a closed or nearly closed path that encloses or partially encloses at least one existing object, then it is ambiguously a selection operation or a draw operation, as illustrated by path 310 in FIG. 3. Also, if the gesture is a nearly straight line that approximately underlines textual image material or falls besides several lines of text, then it is ambiguously a selection operation or a draw operation. It will be clear to skilled practitioners that other comparisons of the user's stroke with displayed image material can be devised for which the gesture can be interpreted either as selecting certain image material, or else existing simply as hand-drawn digital ink image content.

In such a case, processing proceeds to step 290. The internal "CHOICE_PRESENTED_STATE" state variable is set to TRUE, and a choice is presented to the user as to whether to interpret the gesture as a selection operation or not. This takes the form of a pop-up menu choose box in close proximity to the gesture, as shown at 320 in FIG. 3.

If, at step 270 the processor determines that the gesture input at step 250 is clearly a draw operation, for example, closed path strokes that do not enclose anything or open strokes occurring not in proximity to textual image material, the program proceeds to step 280, where the gesture is added as a new marking.

Consider next the processing of user input gestures when the "CHOICE_PRESENTED_STATE" flag is TRUE at step 220, and the display consequently contains a pop-up menu choose box 320. At step 230 the system makes a determination as to whether the gesture is a tap/click inside the pop-up choice box. If the gesture is a tap/click inside the choice box, then the gesture is interpreted as a selection operation, the tentative path is erased and the program services the selection at step 260.

If on the other hand the mouse/stylus press is outside the choice box, then the prior gesture is interpreted as drawn material. It is immediately rendered as such and entered into the displayed object data structure 162 at step 240, and the system continues to gather the path of the currently input gesture, at step 250. From step 250, when the pen is lifted, the current gesture is evaluated at step 270, as described above.

Thus the present invention provides the user with the ability to execute unimpeded sequential input of freeform strokes of many types rapidly and without making explicit choices about user interface modes or interpretations. The user can perform selection operations without first entering a selection mode. Instead, a selection choice is presented, but only after the gesture has been drawn and it is found to be ambiguous in intent. Although the present invention has been described in terms of draw gestures, it will be noted that the present invention is not limited to draw gestures only. Additional commands can be recognized by their intrinsic characteristics and context, for example, a cross-out/erase command indicated by a "scratch out" gesture. This would cause an "Erase?" menu button to pop up, which could be pressed to erase crossed-out material, or ignored if the intent was to draw and leave on the canvas a cross-out marking. Numerous other such examples will occur to those skilled in the art.

It is noted that within this application reference will be made to "tapping", "clicking on" or otherwise selecting an object. The term tapping is generally used in reference to the physical act of touching the stylus of a pen-based computing system to the screen or tablet and shortly thereafter lifting the stylus from the screen (i.e. within a predetermined period of time) without moving the stylus any significant amount (i.e. less than a predetermined amount, as for example two pixels). This is a typical method of selecting objects in a pen-based computing system. The term "clicking on" is intended to be broader in scope and is intended to cover not only tapping, but also the action of selecting an object using a button associated with a mouse or track ball as well as the selection of an object using any other pointer device.

While the present invention has been illustrated and described with reference to specific embodiments, further modification and improvements will occur to those skilled in the art. Although discussed with reference to text and line art, the operations illustrated herein apply equally well to any type of image object. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this invention is not limited to the particular forms illustrated and that it is intended in the appended claims to embrace all alternatives, modifications, and variations which do not depart from the spirit and scope of this invention.

What is claimed is:

1. A graphical input and display system having a user interface for creating and editing a source electronic image comprising:
   user input means for selecting and manipulating image objects;
   display means for displaying image objects and system response to user selection actions;
   a processor, connected for receiving requests for image editing operations and for accessing a memory structure;
   a user interaction module for inferring the intent of user input gestures as entering new image material of arbitrary graphical content or selecting and modifying existing image material without pre-selecting an input mode; and
   data memory means comprising:
      displayed objects data structure;
      internal state data structure; and
      selected material data structure.

2. The graphical input and display system having a user interface for creating and editing an electronic image according to claim 1, wherein said user input means includes a stylus.

3. The graphical input and display system having a user interface for creating and editing an electronic image according to claim 1, wherein said user input means includes a pen.

4. The graphical input and display system having a user interface for creating and editing an electronic image according to claim 1, wherein said user input means includes a mouse.

5. The graphical input and display system having a user interface for creating and editing an electronic image according to claim 1, wherein said selected material data structure includes not less than one mouse/stylus path state and not less than one choice presented state.

6. The graphical input and display system having a user interface for creating and editing an electronic image according to claim 1, further comprising image input means.

7. A method for utilizing a user interface on a graphical input and display system having user input means, image input means, a processor, and a user interaction module for entering new image material or selecting and modifying existing image material without preselecting an input mode for creating and editing an electronic image object comprising:
   receiving a user input gesture;
   accessing a user interaction module for inferring the intent of user input gestures as entering new image material of arbitrary graphical content or selecting and modifying existing image material without pre-selecting an input mode;
   determining whether said gesture is a selection operation, a draw operation, or an ambiguous operation;
   rendering said draw operation as a permanent mark;
   servicing said selection operation; and
   presenting the user with a choice for interpreting said ambiguous operation.

8. The method for utilizing a user interface on a graphical input and display system for creating and editing an electronic image object according to claim 7, wherein said user input gesture includes a single tap made on top of or to the side of the electronic image object.

9. The method for utilizing a user interface on a graphical input and display system for creating and editing an electronic image object according to claim 8, wherein said single tap is interpreted as a selection gesture.

10. The method for utilizing a user interface on a graphical input and display system for creating and editing an electronic image object according to claim 7, wherein said user input gesture is interpreted as a drawn dot when said user input gesture includes a single tap made not on top of or to the side of the electronic image object.

11. The method for utilizing a user interface on a graphical input and display system for creating and editing an electronic image object according to claim 9, wherein said single tap is interpreted as a drawn dot.

12. The method for utilizing a user interface on a graphical input and display system for creating and editing an electronic image object according to claim 7, wherein said user input gesture includes a closed or nearly closed path enclosing at least one electronic image object.

13. The method for utilizing a user interface on a graphical input and display system for creating and editing an electronic image object according to claim 7, wherein said user input gesture is made by pressing of a mouse button.

14. The method for utilizing a user interface on a graphical input and display system for creating and editing an electronic image object according to claim 7, wherein said user input gesture is made by touching of a stylus or pen to a display screen of the display device.

15. The method for utilizing a user interface on a graphical input and display system for creating and editing an electronic image object according to claim 7, wherein said servicing said selection operation comprises:

indicating at least one selected object; and entering a gesture interpretation state.

16. The method for utilizing a user interface on a graphical input and display system for creating and editing an electronic image object according to claim 7, wherein said ambiguous operation includes a gesture which completely encloses at least one existing electronic image object.

17. The method for utilizing a user interface on a graphical input and display system for creating and editing an electronic image object according to claim 7, wherein said ambiguous operation includes a gesture which partially encloses at least one existing electronic image object.

18. The method for utilizing a user interface on a graphical input and display system for creating and editing an electronic image object according to claim 7, wherein said ambiguous operation includes a gesture which forms a line beneath the electronic image object or beside the electronic image object.

19. The method for utilizing a user interface on a graphical input and display system for creating and editing an electronic image object according to claim 7, wherein said draw operation includes either or both open stroke gestures or closed path gestures which do not enclose an existing electronic image object.

20. The method for utilizing a user interface on a graphical input and display system for creating and editing an electronic image object according to claim 7, wherein said choice for interpreting said ambiguous operation includes a pop-up menu choice box.

21. The method for utilizing a user interface on a graphical input and display system for creating and editing an electronic image object according to claim 20, further comprising interpreting a tap inside said pop-up menu choice box as a selection operation.

22. The method for utilizing a user interface on a graphical input and display system for creating and editing an electronic image object according to claim 20, further comprising interpreting a tap outside said pop-up menu choice box as a draw operation.

23. An article of manufacture comprising a computer usable medium having computer readable program code embodied in said medium which, when said program code is executed by said computer causes said computer to perform method steps for invoking draw or select/command operations without setting a user interface mode prior to creating and manipulating a source electronic image, said method steps comprising:

receiving a user input gesture;

accessing a user interaction module for inferring the intent of user input gestures as entering new image material of arbitrary graphical content or selecting and modifying existing image material without pre-selecting an input mode;

determining whether said gesture is a selection operation, a draw operation, or an ambiguous operation;

if said gesture is a draw operation, rendering said draw operation as a permanent mark;

if said gesture is a selection operation, servicing said selection operation; and if said gesture is an ambiguous operation, presenting the user with a choice for interpreting said ambiguous operation.

24. A method for storing data in a memory for access by a program being executed on a computer for invoking draw or select/command operations without setting a user interface mode prior to creating and manipulating a source electronic image, said method comprising:

storing a displayed objects data structure in said memory;

storing an internal state data structure for inferring the intent of user input gestures as entering new image material of arbitrary graphical content or selecting and modifying existing image material without pre-selecting an input mode, comprising:

storing a mouse/stylus path; and storing a choice presented state; and storing a selected material data structure.

* * * * *